United States Patent [19]

Komura et al.

[11] Patent Number: 5,602,701
[45] Date of Patent: Feb. 11, 1997

[54] HEAD ACTUATOR FOR MAGNETIC DISK DRIVE UNIT

[75] Inventors: Yukihiro Komura; Yoshiaki Nagasawa; Katsuaki Ishida; Osamu Yamazaki, all of Kawasaki; Tomoo Sukagawa, Higashine, all of Japan

[73] Assignee: Fujitsu Limited, Japan

[21] Appl. No.: 394,230

[22] Filed: Feb. 24, 1995

[30] Foreign Application Priority Data

Apr. 19, 1994 [JP] Japan .................................... 6-080186

[51] Int. Cl.⁶ ............................ G11B 5/55; G11B 21/08
[52] U.S. Cl. .................. 360/106; 360/97.02; 360/98.07
[58] Field of Search ............................. 360/97.01–97.02, 360/106

[56] References Cited

U.S. PATENT DOCUMENTS

| | | | |
|---|---|---|---|
| 4,860,135 | 8/1989 | Cain | 360/97.02 |
| 5,184,265 | 2/1993 | Foote et al. | 360/106 |
| 5,367,419 | 11/1994 | Kazama | 360/103 |
| 5,422,776 | 6/1995 | Thorson et al. | 360/98.07 |
| 5,446,608 | 8/1995 | Sanada | 360/106 X |

FOREIGN PATENT DOCUMENTS

| | | |
|---|---|---|
| 63-99756 | 5/1988 | Japan . |
| 63-188871 | 8/1988 | Japan . |
| 63-311674 | 12/1988 | Japan . |
| 1130365 | 5/1989 | Japan . |

*Primary Examiner*—John H. Wolff
*Attorney, Agent, or Firm*— Greer, Burns & Crain, Ltd.

[57] ABSTRACT

A head actuator for a magnetic disk drive unit which eliminates the possibility of track slip due to a mechanical external force and allows high-speed access. The head actuator includes a carriage having a body provided rotatably to a shaft fixed to a housing and an arm fixed to the body so as to extend substantially perpendicularly to the shaft, a supporting member mounted on the body on its side opposite to the arm with respect to the shaft, and a coil fixed to the supporting member and receiving a driving force from a static magnetic field. The supporting member is formed of a material having a specific gravity larger than that of a material forming the body of the carriage.

6 Claims, 4 Drawing Sheets

HEAD ACTUATOR FOR MAGNETIC DISK DRIVE UNIT

BACKGROUND OF THE INVENTION

1. Field of the Invention

The present invention relates to a head actuator for a magnetic disk drive unit.

2. Description of the Related Art

In a magnetic disk drive unit to be used as an external storage for a computer, a magnetic head is driven by a head actuator to perform tracking of the magnetic head on a magnetic disk rotatably driven in a steady state, thereby performing position control of the magnetic head in the radial direction of the magnetic disk. As a typical structure of the head actuator, there is known a rotary structure such that a carriage, on which the magnetic head is mounted, is rotated about a shaft. The optimization of such a structure has been searched for.

A conventional rotary head actuator comprises, for example, a carriage adapted to rotate to rotate about a shaft fixed to a housing and having an end on which a magnetic head is mounted, and a coil fixed to the carriage and receiving a driving force from a static magnetic field. The coil is usually located on the side of the actuator opposite to the magnetic head with respect to the shaft, and a wound portion of the coil parallel to the shaft crosses a radial magnetic flux produced by a permanent magnet to thereby generate a driving force of the head actuator. The permanent magnet is provided, for example, on the housing to which the shaft is fixed, and a driving direction of the head actuator depends on the direction of the magnetic flux generated by the permanent magnet and the direction of a current flowing in the coil.

Generally in such a magnetic disk drive unit, it is known that the larger the distance between the shaft of the head actuator and the magnetic head, the smaller the fluctuation in yaw angle (angle of the magnetic head to tracks on the magnetic disk) and the more advantageous in follow-up performance of the tracks in the case where the magnetic head is separated into an inductive head for writing and a magnetoresistive head (MR head) for reading (Japanese Patent Application filed by the present applicant on Dec. 7, 1993 and entitled "Magnetic Disk Drive Unit".

If a portion of the carriage on the side where the magnetic head is mounted is long, the weight distribution of the head actuator in its axial direction is unbalanced and causes a problem in that track slip, due to a mechanical external force, tends to occur. That is, if the center of gravity of the head actuator is not positioned at the shaft, the inertia/due to application of a mechanical external force to the magnetic disk drive unit, acts in such a direction as to rotate the head actuator, resulting in the tendency of the track to slip. A conventional means to prevent such track slip is, for example, providing a balancer weight at an end of the coil to thereby position the center of gravity of the head actuator at the shaft. However, the provision of a balancer weight at the end of the coil greatly increases the inertia of the head actuator making high-speed access difficult.

SUMMARY OF THE INVENTION

It is therefore an object of the present invention to provide a head actuator for a magnetic disk drive unit which eliminates the possibility of track slip due to a mechanical external force and allows high-speed access.

In accordance with an aspect of the present invention, there is provided a head actuator for a magnetic disk drive unit having a housing, said head actuator comprising a carriage having a body rotatably mounted to a shaft fixed to said housing, and an arm extending from said body substantially perpendicularly to said shaft, said arm having an end portion supporting a magnetic head; a supporting member mounted on said body on its side substantially opposite to said arm with respect to said shaft; and a coil fixed to said supporting member and receiving a driving force from a static magnetic field; wherein a specific gravity of said supporting member is larger than a specific gravity of said carriage.

The supporting member for supporting the coil is mounted on the body of the carriage on the side substantially opposite to the arm with respect to the shaft, and the specific gravity of the supporting member is set greater than that of the carriage. Therefore, the center of gravity of the head actuator can be easily positioned at the shaft. Further, the supporting member having a relatively large specific gravity is located in the vicinity of the shaft. Therefore, the inertia of the head actuator can be prevented from being unduly increased, thereby allowing high-speed access.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
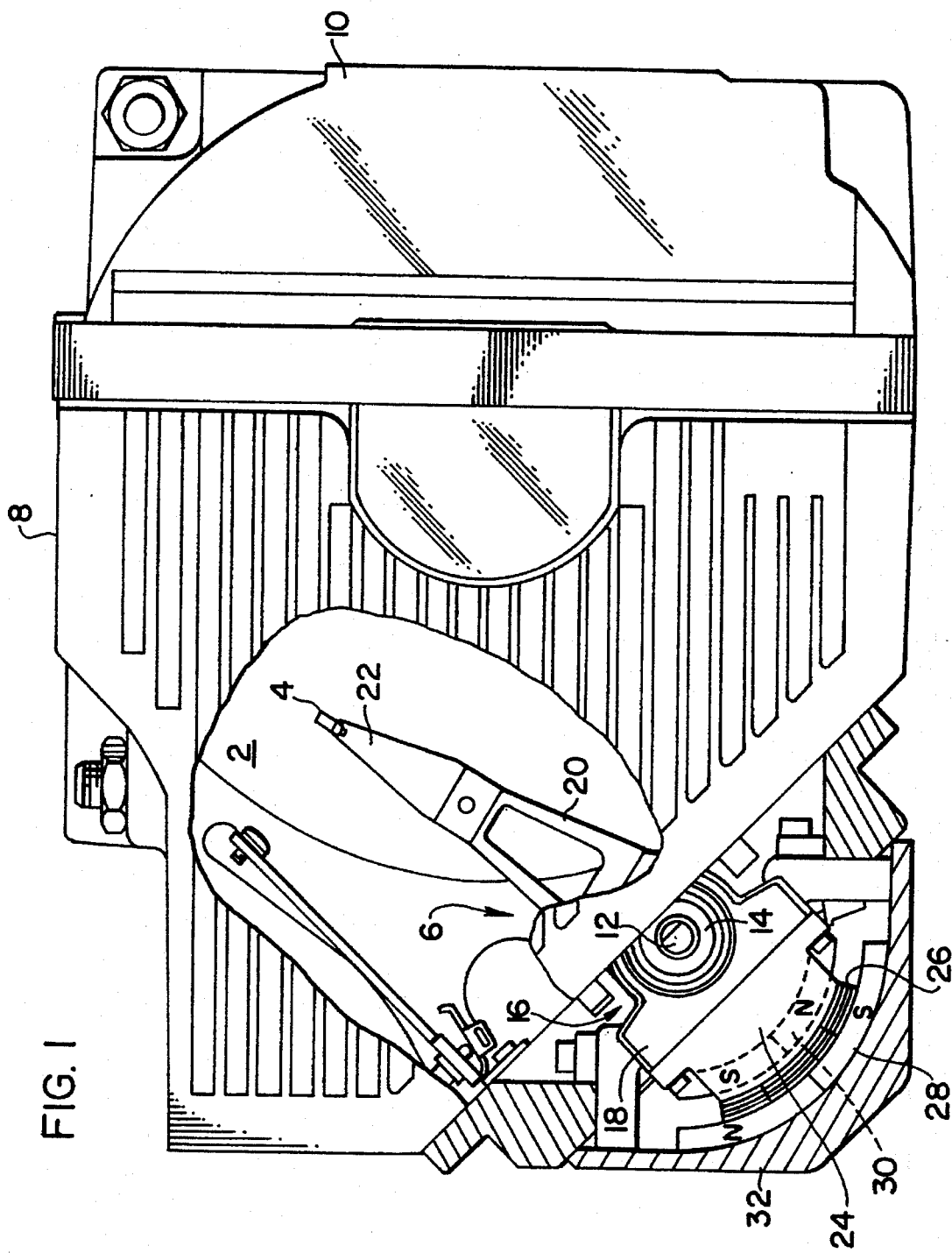
FIG. 1 is a partially sectional plan view of a magnetic disk drive unit to which the present invention is applicable.

FIG. 1 is a partially sectional plan view of a magnetic disk drive unit to which the present invention is applied. The magnetic disk drive unit has a housing 8 and a cover 10. There are provided in the housing 8 and the cover 10 a plurality of magnetic disks 2, a plurality of magnetic heads 4 for recording and reproducing information on the magnetic disks 2, and a rotary head actuator 6 for supporting the magnetic heads 4 and moving them between tracks on the magnetic disks 2. The head actuator 6 includes a carriage 16 mounted through bearings 14 to a shaft 12. The carriage 16 comprises a body 18 rotatably mounted to the shaft 12 and a plurality of arms 20 extending from the body 18 substantially perpendicularly to the shaft 12.

Each magnetic head 4 is mounted to the tip of a spring arm 22 which in turn is mounted to each arm 20. When each magnetic disk 2 is not in rotation, each magnetic head 4 is pressed on the corresponding magnetic disk 2 by an elastic force of the corresponding spring arm 22. When each magnetic disk 2 is in rotation, each magnetic head 4 is allowed to fly at a position where a flying force generated by an air flow between the magnetic head 4 and the corresponding magnetic disk 2 balances the elastic force of the corresponding spring arm 22. A supporting member 24 is provided on the body 18 of the carriage 16 on the side substantially opposite to the arm 20 with respect to the shaft 12. Variations in form of the supporting member 24 will be hereinafter described.

A coil 26 is fixed to an outer circumferential portion of the supporting member 24 by bonding, for example. Permanent magnets 28 and 30 are provided outside and inside of the coil 26, respectively, to generate a magnetic field for obtaining a driving force of the head actuator 6 due to the interaction between the magnetic field and a current flowing in the coil 26. Reference numeral 32 denotes a yoke for forming a magnetic circuit including the permanent magnets 28 and 30. The magnetic circuit generates a magnetic flux in the radial direction between the permanent magnets 28 and 30, and the magnetic flux crosses a wound portion of the coil 26 parallel to the shaft 12 to thereby generate the driving force of the head actuator 6.

Figure 2:
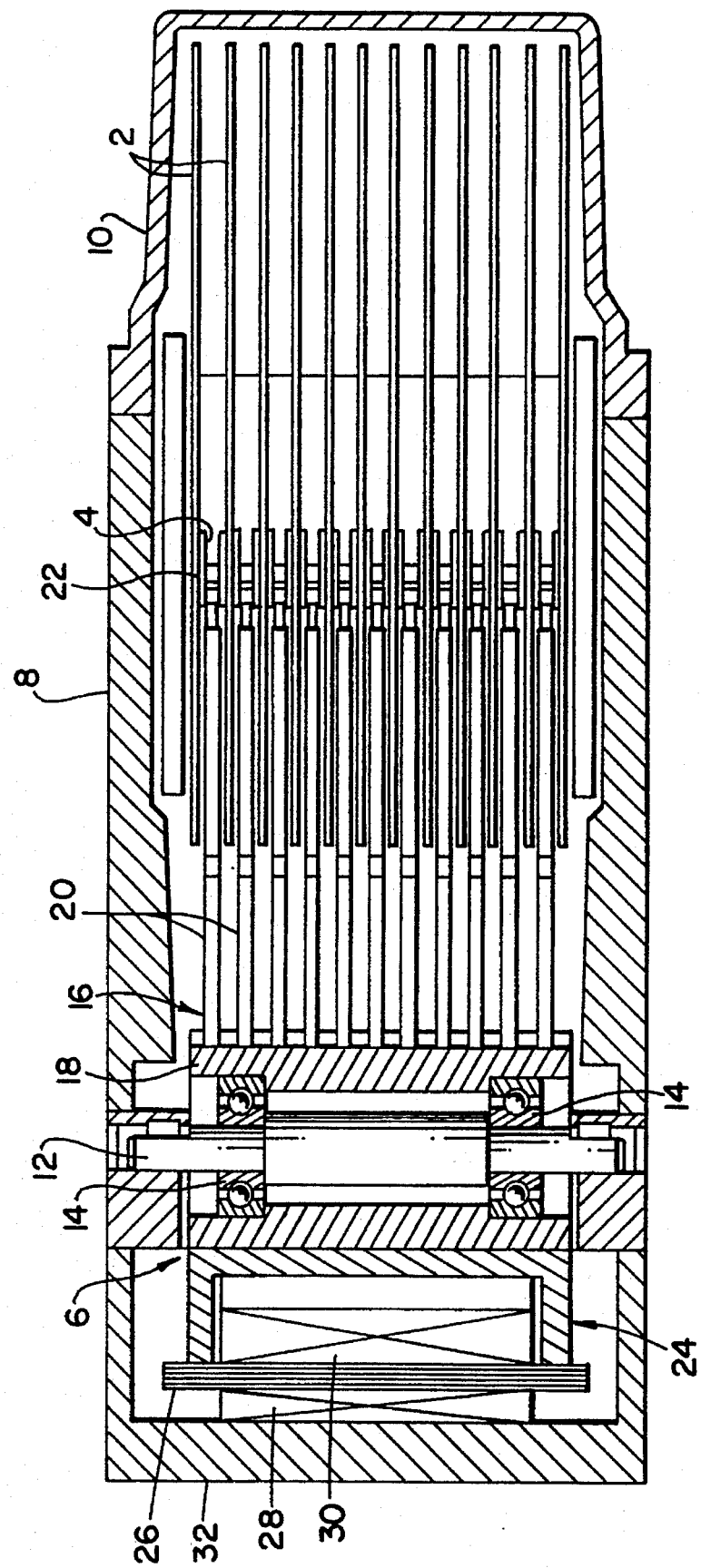
FIG. 2 is a vertical sectional view of the magnetic disk drive unit, showing a first preferred embodiment of a supporting member shown in FIG. 1.

FIG. 2 is a vertical sectional view of the magnetic disk drive unit, showing a first preferred embodiment of the supporting member 24. In this preferred embodiment, the supporting member 24 is formed as an integral member having a substantially C-shaped section, and it is fixed to the body 18 of the carriage 16 by means of screws, for example. The body 18 and the arms 20 constituting the carriage 16 are integrally formed with each other, for example. The carriage 16 is formed of a material having a small specific gravity, so as to reduce the inertia of the head actuator 6. For example, the carriage 16 is formed of aluminum alloy (specific gravity: about 2.7) or magnesium alloy (specific gravity: about 1.7).

The length of the supporting member 24 in the radial direction (the length in the horizontal direction as viewed in FIG. 2) is set sufficiently smaller than the length of each arm 20 in the same direction, so as to make the unit compact and reduce the inertia of the head actuator. In the present invention, the supporting member 24 is therefore formed of a material having a specific gravity larger than that of the material of the carriage 16. Preferably, the weight and the shape of the supporting member 24 are set so that the weight distribution of the head actuator 6 in the radial direction is balanced at the shaft 12. With this setting, even when a mechanical external force is applied to the magnetic disk drive unit, the force is prevented from acting so as to rotate the head actuator 6, thereby improving the tracking performance of the magnetic heads 4 to the magnetic disks 2.

In this preferred embodiment, the supporting member 24 having a relatively large weight is located in the vicinity of the shaft 12, and the coil 26 having a relatively small weight is located outside of the supporting member 24. Accordingly, the inertia of the head actuator 6 is not unduly enlarged in setting the center of gravity of the head actuator 6 at the shaft 12. As a result, high-speed access of the head actuator 6 is attainable. In the case where the material of the carriage 16 is aluminum alloy or magnesium alloy as mentioned above, the material of the supporting member 24 may be selected from titanium (specific gravity: about 4.5), stainless steel (specific gravity: about 8.0), brass (specific gravity: about 8.5), or tungsten alloy (specific gravity: about 18), for example. These materials may be suitably used according to a degree of weight unbalance of the head actuator 6 just after assembled.

Figure 3:
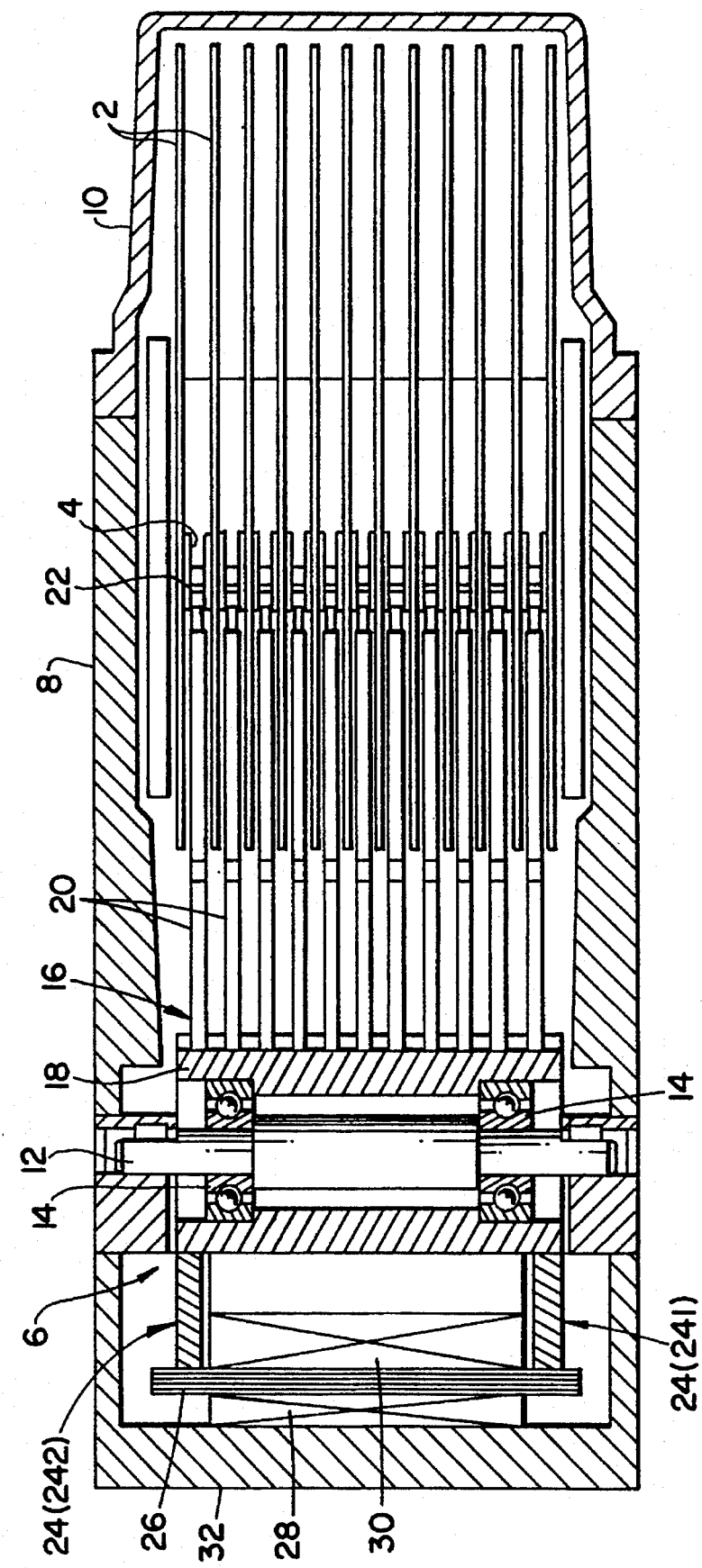
FIG. 3 is a vertical sectional view of the magnetic disk drive unit, showing a second preferred embodiment of the supporting member.

FIG. 3 is a vertical sectional view of the magnetic disk drive unit, showing a second preferred embodiment of the supporting member 24. In contrast with the first preferred embodiment shown in FIG. 2 wherein the supporting member 24 is an integral member, the second preferred embodiment herein is characterized in that the supporting member 24 is separated into a first part 241 for supporting a lower end portion of the coil 26 and a second part 242 for supporting an upper end portion of the coil 26. The material of the supporting member 24 in the second preferred embodiment is the same as that of the supporting member 24 in the first preferred embodiment. That is, the specific gravity of the supporting member 24 in the second preferred embodiment is larger than the specific gravity of the carriage 16.

So far as the above condition on the specific gravity of the supporting member 24 is satisfied, the material of the first part 241 may be different from the material of the second part 242. The need of making the materials of the first part 241 and the second part 242 different from each other arises when the weight distribution of the head actuator 6 in the axial direction (the vertical direction as viewed in FIG. 3) is unbalanced. In this case, preferably, the weights and the shapes of the first part 241 and the second part 242 are set so that the weight distribution of the head actuator 6 in the axial direction is balanced at a substantially axial central portion of the shaft 12.

Figure 4:
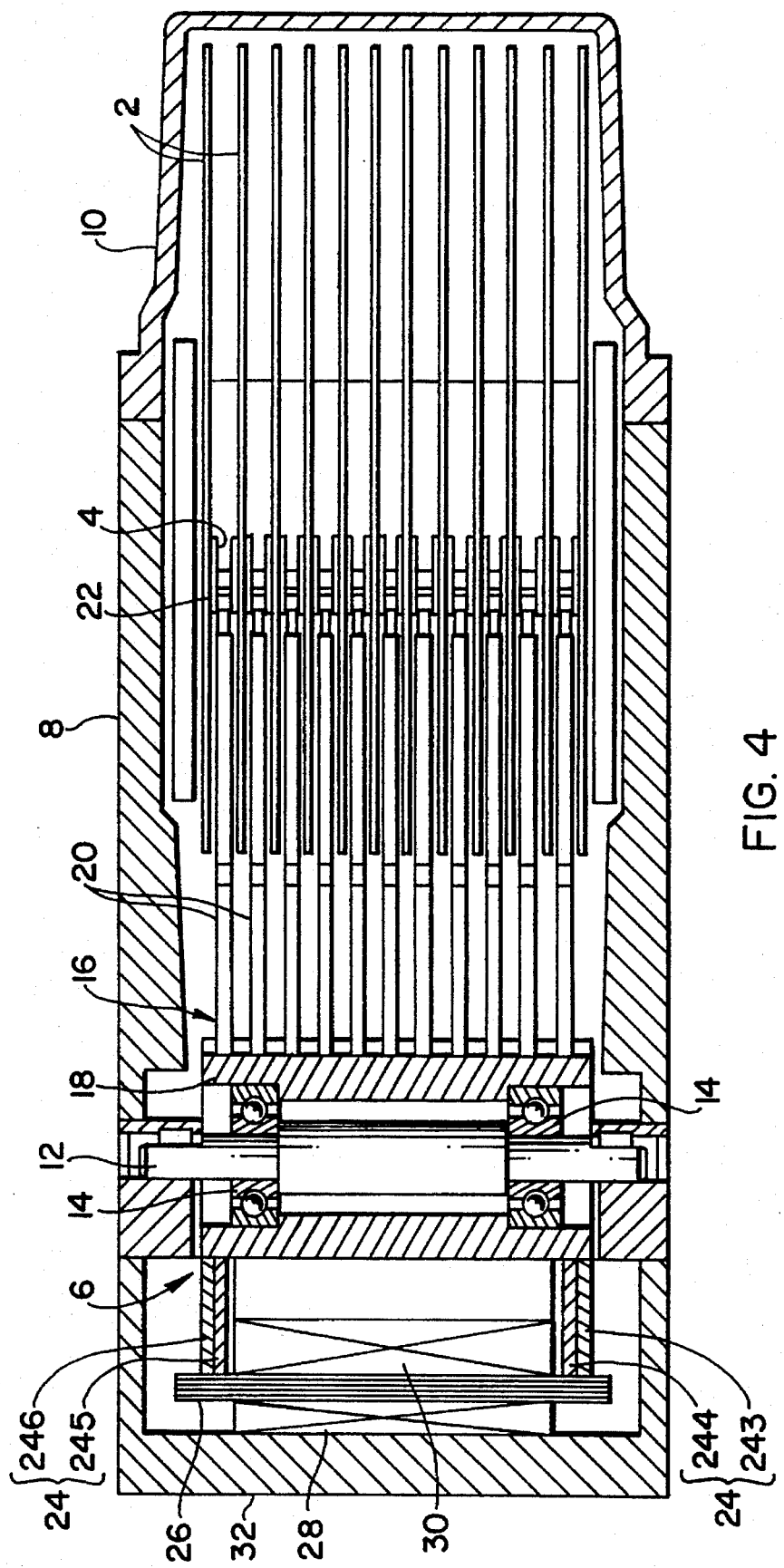
FIG. 4 is a vertical sectional view of the magnetic disk drive unit, showing a third preferred embodiment of the supporting member.

FIG. 4 is a vertical sectional view of the magnetic disk drive unit, showing a third preferred embodiment of the present invention. In this preferred embodiment, the supporting member 24 comprises two lower parts 243 and 244 formed of two kinds of materials which lower parts correspond to the first part 241 of the supporting member 24 in the second preferred embodiment shown in FIG. 3 and two upper parts 245 and 246 formed of two kinds of materials which upper parts correspond to the second part 242 of the supporting member 24 in the second preferred embodiment. With this arrangement, the weight distribution of the head actuator 6 in the axial direction can be balanced more accurately by suitably setting the specific gravity of each part of the supporting member 24.

As described in the above preferred embodiments, when a plurality of magnetic disks 2 are used, a plurality of arms 20 of the carriage 16 whose number corresponds to the number of the magnetic disks 2 must be provided, resulting in a tendency that the total weight of the arms 20 is increased. Accordingly, the application of the present invention to the magnetic disk drive unit having such plural magnetic disks 2 and the provision of the supporting member 24 formed of a material having a large specific gravity in the vicinity of the shaft 12 are greatly effective in positioning the center of gravity of the head actuator 6 at the shaft 12.

As described above, the present invention exhibits the effect that it can provide a head actuator for a magnetic disk drive unit which eliminates the possibility of track slip due to a mechanical external force and allows high-speed access.

What is claimed is:

1. A head actuator for a magnetic disk drive unit having a housing, said head actuator comprising:

a carriage having a body, said body having a first and second side rotatably mounted to a shaft fixed to the housing, and an arm extending from said first side of said body substantially perpendicularly to said shaft, said arm being formed integrally with said body and having an end portion supporting a magnetic head, said carriage having a predetermined specific gravity;

a supporting member formed of a material selected from a group consisting of metal and metal alloy, said supporting member having a predetermined Specific gravity greater than said predetermined specific gravity of said carriage, said supporting member removably mounted to said body on said second side substantially opposite said arm with respect to said shaft, whereby the effect of an external mechanical force on rotation of the head actuator is reduced, thus improving track performance of said magnetic head; and a coil fixed to said supporting member and receiving a driving force from a static magnetic field.

2. A head actuator according to claim 1, wherein a weight and a shape of said supporting member are determined such that a weight distribution of said head actuator in a radial direction is balanced at said shaft.

3. A head actuator according to claim 2, wherein said supporting member comprises a plurality of parts separated in an axial direction of said shaft, and a weight and a shape of each of said parts are determined such that a weight distribution of said head actuator in said axial direction is balanced at an axial central portion of said shaft.

4. A head actuator according to claim 2, wherein said carriage is formed of a material selected from aluminum alloy and magnesium alloy, and said supporting member is formed of a material selected from a group consisting of titanium, stainless steel, brass, and tungsten alloy.

5. A head actuator according to claim 2, wherein said arm and said magnetic head comprise a plurality of arms and a plurality of magnetic heads, respectively, wherein said plurality of arms and magnetic heads are configured for use with a plurality of magnetic disks.

6. A head actuator according to claim 2, wherein said predetermined length of said arm is greater than a predetermined length of said supporting member.

* * * * *